Aug. 20, 1968  J. KNOWLES  3,397,534
ENGINE SECONDARY AIR INJECTION CONTROL
Original Filed Dec. 20, 1965

JAMES KNOWLES
*INVENTOR*

BY John R. Faulkner
Robert E. McCollum
*ATTORNEYS*

United States Patent Office 3,397,534
Patented Aug. 20, 1968

3,397,534
ENGINE SECONDARY AIR
INJECTION CONTROL
James Knowles, Bloomfield Hills, Mich., assignor to Ford Motor Company, Dearborn, Mich., a corporation of Delaware
Continuation of application Ser. No. 514,822, Dec. 20, 1965. This application Jan. 17, 1968, Ser. No. 698,666
11 Claims. (Cl. 60—30)

ABSTRACT OF THE DISCLOSURE

An internal combustion engine has a secondary air manifold supplied with air by an engine driven air pump, the air being directed to the engine exhaust ports for chemical combination with unburned hydrocarbons in the exhaust gas, the air pump discharge flow being diverted from the air manifold above a predetermined vehicle speed by fluid from a vehicle speed responsive governor to reduce the load of driving the air pump and thereby conserving horsepower.

---

This application is a continuation of application Ser. No. 514,822, filed Dec. 20, 1965, which is now abandoned.

This invention relates, in general, to an internal combustion engine. More particularly, it relates to means for controlling the injection of smog controlling secondary air into an internal combustion engine.

With the increased interest in smog preventative devices, most engines now manufactured for use in motor vehicles have some means to reduce the output of unburned hydrocarbons and other harmful elements into the atmosphere. In some engines, this takes the form of an engine driven air compressor that supplies a source of secondary air to the region adjacent the engine exhaust ports for conversion of the unburned hydrocarbons and other smog producing elements present in the exhaust gases into less harmful forms. In most cases, the air pump is driven continuously regardless of engine speed, and, therefore, uses up a considerable amount of useful horsepower.

Engines, as a rule, produce the greatest amount of smog inducing elements at low speeds when the air-fuel ratios of the combustible mixtures are other than optimum. As engine speed increases, the percentage of harmful unburned hydrocarbons and other elements present in the combustion product gases decreases, and therefore, little if any additional or secondary air is needed at higher engine speeds. With the present commercial constructions, however, no provision is made for controlling the supply of secondary air; in most cases, it is supplied as long as the engine is operating. This results in a considerable waste of horsepower to drive the pump at higher speeds.

Therefore, it is a primary object of the invention to provide a control for a fluid pump that automatically reduces the load on the pump upon the attainment of a predetermined vehicle speed.

It is another object of the invention to provide a control for an engine driven air pump that below a predetermined vehicle transmission speed supplies secondary air to an air injection manifold of the engine for anti-smog purposes, and above a predetermined vehicle speed diverts the pump output to reduce the horsepower needed to drive the pump.

It is a still further object of the invention to provide an internal combustion engine secondary air injection manifold control that includes an air diversion valve spring biased to one position below a predetermined vehicle speed to supply air to the manifold, and movable to a second position by a vehicle speed responsive fluid pressure governor signal force above a predetermined vehicle speed to divert the air supply either back to the inlet of the pump or out to ambient air.

Figure 1:
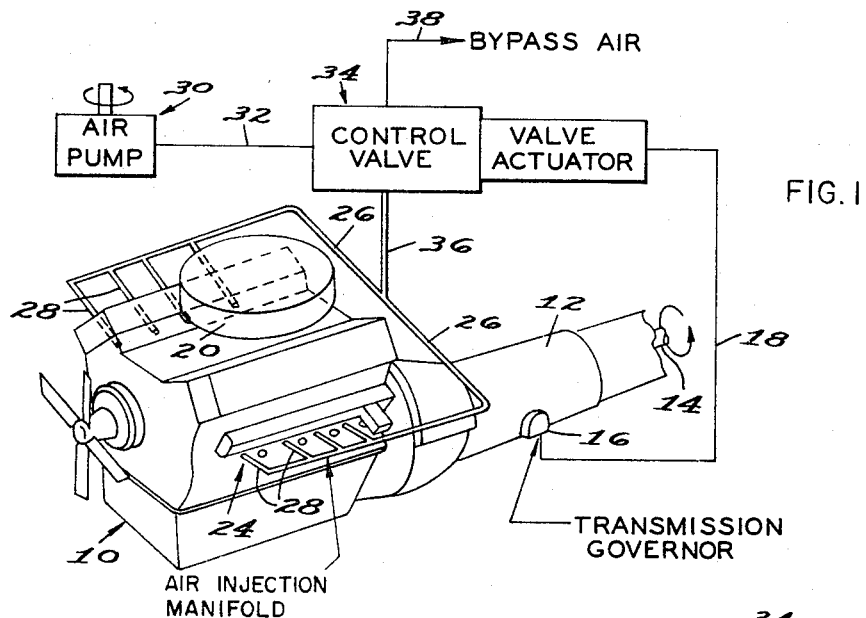
Figure 2:
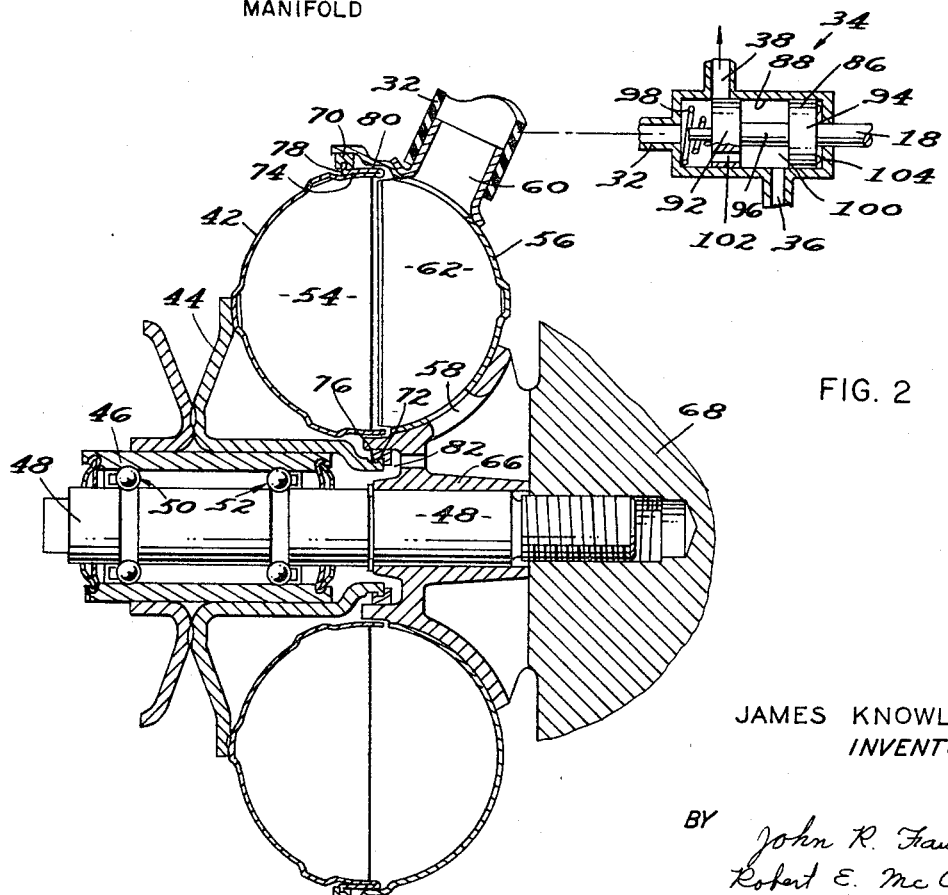

Other objects, features and advantages of the invention will become apparent upon reference to the succeeding, detailed description thereof, and to the drawings illustrating the preferred embodiment thereof; wherein, FIGURE 1 shows, schematically, an air flow control system embodying the invention; and, FIGURE 2 shows a cross-sectional view of portions of the system of FIGURE 1.

FIGURE 1 shows a conventional motor vehicle type internal combustion engine 10 drivingly connected to a transmission 12 having a power output shaft 14. Transmission 12 preferably would be of the automatic type, for a purpose that will become clear later. For example, it could be of the multiple of planetary gearset type shown in U.S. 3,103,831 that provides a plurality of forward speed drives and a reverse drive, the forward speed drive being obtained automatically as a function of the changes in vehicle speed and torque demand by the operator. Power output shaft 14, in this case, would be connected through the conventional differential gearing (not shown) to the driving rear axle shafts that are operably connected to the driving wheels of the motor vehicle in a known manner.

Transmission 12, in this case, contains a known type of fluid pressure governor indicated in general at 16. The governor could be similar to that indicated at 216 in FIGURE 2 of the above-mentioned U.S. 3,103,831, and the details of construction and operation are, therefore, not given. Suffice it to say that the governor would be driven by the transmission power output shaft 14, and would supply a fluid pressure in a line 18 that varies in a parabolic manner as of the square of the speed of shaft 14. Since shaft 14 is operably connected to drive the vehicle wheels, governor 16 therefore provides a varying fluid pressure that is indicative of the changes in vehicle speed. The known governors generally have one or more stages of operation providing varying rates of change in the pressure.

Engine 10, in this case, has a conventional air filter 20 covering the primary air inlet to the conventional carburetor (not shown). Air taken through filter 20 passes into the main air induction system, combining with the necessary fuel for combustion in the engine cylinders. The engine also has conventional exhaust manifolds 22 and 24 connecting the combustion product gases from the exhaust valve ports (not shown) to the exhaust system.

Engine 10 is also provided with a secondary air injection manifold 26 that has a plurality (corresponding to the number of cylinders) of branch conduits 28 each of which terminate in the region of the engine exhaust valve ports; that is, in a region where the gases are exhausted from the cylinder combustion chambers. Manifold 26 is supplied with secondary air from an engine driven air pump 30 that discharges air through a line 32.

In general, air discharge line 32 is controlled by a valve mechanism 34 containing a valve that is normally spring biased to a position connecting discharge line 32 and a line 36 connected to manifold 26. The control valve is adapted to be acted upon by the governor fluid pressure signal force in line 18 so that above a predetermined vehicle speed, the control valve will be moved to a position blocking communication between lines 32 and 36, while connecting line 32 to a bypass line 38. The bypass line is shown as discharging to atmosphere; however, it is within the scope of the invention to connect the bypass line back to the inlet of air pump 30 to lower the pumping requirements of the pump and increase its operating efficiency.

FIGURE 2 shows the details of construction of air pump 30 and the control valving 34. More specifically, the pump is of the centrifugal type and includes a semi-toroidal shell 42 that is welded or otherwise secured to one side of a V-type drive pulley 44. The pulley has a belt drive connection (not shown) to the engine crankshaft, and is fixed on sleeve 46. The sleeve is rotatably mounted on a stationary shaft 48 by a pair of spaced annular ball bearing units 50 and 52. The ends of the sleeve are suitably sealed as shown.

Shell 42 supports a number of circumferentially spaced impeller or pump blades 54 that are dish-shaped in cross section. The shell or casing 42 cooperates with and faces a semi-toroidal shaped stationary or stator casing 56 that is hollow and bladeless. The stator has an air inlet opening 58 and a fluid discharge outlet 60 located on opposite circumferential sides of a narrow block seal member 62. The block seal prevents direct communication between the inlet and outlet, and forces the fluid to travel around the toroidal path between in a known manner. The stator 56 has a hub 66 fixedly secured to shaft 48, which is threadedly secured in a stationary part 67 of the engine 10.

The axial spaces 68 and 69 between the outer and inner radial portions of the pump and stator are sealed by a pair of elastomeric sealing rings 70 and 72. These rings are each cemented or bonded in a suitable manner to extensions 74 and 76, respectively, of stator 56. They cooperate with external flanges or lips 78 and 80 provided, respectively, on the radially outward portion of impeller shell 42 and the inner radial portion of pulley portion 44. During initial rotation of impeller shell 42, each lip 78 and 80 will cut its own path into the respective elastomeric ring 70 and 72 to form an effective seal against leakage. The labyrinthian passages 82 and 84 formed by the shell extensions also minimizes circumferential leakage of outlet fluid back to the inlet.

In operation, rotation of impeller shell 42 by pulley 44 causes air to be drawn in through inlet 58 and centrifuged around the toroidal circuit with a helical spiral motion in a known manner until it reaches the block seal member 62, at which point the fluid is diverted into the outlet 60 and into line 32. At this point, it enters the control valve assembly 34 under pressure.

The assembly 34 includes a spool valve 86 that is slidably mounted in the bore 88 of a valve body 90. Opposite ends of the bore are connected respectively to the air pump discharge line 32 and to the governor fluid pressure signal line 18. Laterally spaced portions of the bore 88 are connected to the atmospheric vent line 38 and to the supply line 36 leading to secondary air injection manifold 26.

The spool valve 86 has a pair of spaced lands 92 and 94 interconnected by a neck portion 96 to define an annular air chamber 100. The valve is normally biased to the position shown by a spring 98 to block flow between inlet 32 and vent 38. Land 92 contains an unrestricted air passage 102, which, in the position of the valve shown, connects the air in line 32 directly to line 36 to supply the engine with secondary air. When the vehicle speed attains a predetermined level of say 50 miles per hour, for example, the fluid pressure in line 18 acting against the right end of valve land 94 will have risen to a value sufficient to overcome the force of spring 98 and air pressure acting against land 92 to move the valve to the left. This will block flow between lines 32 and 36 and connect lines 32 and 38 through passage 102. At this predetermined vehicle speed, therefore, the discharge of air from the air pump will be diverted from the secondary air injection manifold 26, and vented. When the air is vented or bypassed, the back pressure on the pump from manifold 26 decreases; thus, the load on pump 30 is substantially reduced, and only very little horsepower now is required to drive it.

Valve 86 is shown as having a pair of buttons 104 on the right face of land 94 to space the valve from the end of bore 88. This permits governor pressure in line 18 to act over the full area of this portion of the land. If desired, the buttons could be omitted to provide a quick movement to the valve; that is, when land 94 is seated flat against the end of the bore, the pressure acting against the small area of the land defined by the diameter of conduit 18 will determine the time of movement of the valve. However, as soon as the valve moves, the sudden increase in area upon which the fluid acts causes a rapid movement of the valve to the left to connect lines 32 and 38 and disconnect line 36 from fluid chamber 100.

From the foregoing, it will be seen that the invention provides a simple and yet reliable method of restricting the flow of secondary air to the engine secondary manifold at a time when it is not necesary or desired. This results in lowering the horsepower required to drive the air pump, which results in a more economical operation of the engine.

While the invention has been illustrated in its preferred embodiment in the figures, it will be clear to those skilled in the arts to which the invention pertains that many changes and modifications may be made thereto without departing from the scope of the invention.

I claim:

1. An air pump control for use in an engine driven motor vehicle having an exhaust system comprising, in combination, an air pump driven by said engine and discharging air under pressure into the exhaust system of said engine, and control means cooperating with said pump and vehicle responsive to a predetermined vehicle speed to divert said discharge of air from said exhaust system of said engine.

2. A control as in claim 1, said pump comprising an air compressor, said exhaust system including an air injection manifold.

3. A control as in claim 2, said manifold having an air inlet operably connected to said compressor and outlets operably associated with the engine exhaust gas manifold.

4. A control as in claim 2, said vehicle having a transmission driven by said engine and having a power output shaft operably driving said vehicle, fluid pressure governor means driven by said output shaft providing a fluid pressure signal force that increases as a function of the increase in speed of said shaft, said control means being acted upon by said governor pressure.

5. A fluid control for use in a motor vehicle, comprising, in combination, an internal combustion engine having a fluid injection manifold provided with a fluid inlet and a pluralty of outlets, a fluid pump driven by said engine and providing a source of fluid at varying pressures, a vehicle speed responsive fluid pressure signal means providing a source of fluid under pressure that varies as a function of the speed of said vehicle, conduit means connecting the fluid under pressure from said pump to said manifold, control means in said conduit means movable between positions supplying and preventing, respectively, the flow of fluid from said pump to said manifold, and means connecting said vehicle speed responsive pressure signal to said control means to act thereon and move said control means above a predetermined vehicle speed to a position preventing flow of fluid to said manifold.

6. A control as in claim 5, said pump comprising an air compressor, said manifold outlets being connected to the region adjacent the engine exhaust valve ports.

7. A control as in claim 5, said speed responsive fluid pressure means comprising a fluid pressure governor driven by the vehicle transmission power output shaft.

8. A control as in claim 5, said control means including a valve spring biased to a position connecting said pump and manifold and movable by said pressure signal force to a position preventing communication therebetween.

9. A control, as in claim 5, said pump comprising an air compressor, said manifold outlets being connected to the region adjacent the engine exhaust valve ports, said speed responsive fluid pressure means comprising a fluid pressure governor driven by the vehicle transmission power output shaft, said control means including a valve spring biased to a position connecting said pump and manifold and movable by said pressure signal force to a position preventing communication between said pump and manifold.

10. A control as in claim 5, said manifold constituting an engine secondary air supply source separate from the main engine air induction system.

11. A fluid pump control for use in an engine driven motor vehicle, comprising, in combination, a fluid pump driven by said engine and discharging fluid under pressure into portions of said engine, and control means cooperating with said pump and vehicle responsive to a predetermined vehicle speed to divert said discharge of fluid from said engine portions, said pump comprising an air compressor, said engine portions including an air injection manifold, said manifold having an air inlet operably connected to said compressor and outlets operably associated with the engine exhaust gas manifold.

References Cited
UNITED STATES PATENTS

| | | | |
|---|---|---|---|
| 1,979,488 | 11/1934 | Perez | 74—472.1 |
| 3,060,678 | 10/1962 | Ridgway | 60—30 |
| 3,305,042 | 2/1967 | Thorner | 180—106 |

RALPH D. BLAKESLEE, *Primary Examiner.*